(12) United States Patent
Gudmundsen et al.

(10) Patent No.: US 9,292,890 B2
(45) Date of Patent: Mar. 22, 2016

(54) METHOD AND SYSTEM FOR PROVIDING CASE UPDATE NOTIFICATIONS

(75) Inventors: Tor Gudmundsen, Helena, MT (US); Jason Leo Jacob Davidson, Helena, MT (US); Nicholas Patrick Thomas, Helena, MT (US); Alan Glen Stroop, Helena, MT (US)

(73) Assignee: Courtview Justice Solutions, Inc., North Canton, OH (US)

( * ) Notice: Subject to any disclaimer, the term of this patent is extended or adjusted under 35 U.S.C. 154(b) by 302 days.

(21) Appl. No.: 13/172,547

(22) Filed: Jun. 29, 2011

(65) Prior Publication Data

US 2013/0007092 A1  Jan. 3, 2013

(51) Int. Cl.
*G06Q 50/18* (2012.01)
*G06Q 10/10* (2012.01)

(52) U.S. Cl.
CPC ............... *G06Q 50/18* (2013.01); *G06Q 10/10* (2013.01)

(58) Field of Classification Search
CPC .............................. G06Q 50/18; G06Q 10/10

USPC ........................................................ 709/202
See application file for complete search history.

(56) References Cited

U.S. PATENT DOCUMENTS

| 7,668,863 | B2 * | 2/2010 | Kalmick et al. | 705/5 |
| 7,805,457 | B1 * | 9/2010 | Viola et al. | 707/769 |
| 2006/0129445 | A1 * | 6/2006 | McCallum, Jr. | 705/8 |
| 2009/0006973 | A1 * | 1/2009 | Newell et al. | 715/738 |
| 2010/0100572 | A1 * | 4/2010 | Schiller | 707/805 |

* cited by examiner

*Primary Examiner* — Viet Vu
*Assistant Examiner* — Herman Belcher
(74) *Attorney, Agent, or Firm* — Sanford Astor; Brooks Kushman P.C.

(57) ABSTRACT

A method and system for providing case update notifications is provided. Judicial court case updates are received via a judicial court case management system for a judicial court. At least one of the judicial court case updates is identified as being of interest to a user unaffiliated with the judicial court that is participating in the judicial court case. The user is automatically notified of the at least one judicial court case update.

21 Claims, 14 Drawing Sheets

CV2

New User?
Register Here

If you're a new CV2Go user it's easy to get started.

Existing User?
Sign in here.

User _____

Password _____

(Login)  Forgot?

If you wish to subscribe to multiple courts you will be able to select them on the next page. Right now just pick one that your Bar number would be associated with.

Contact CV2Go Support

Let's Sign Up for CV2Go Events

Start by selecting a court that you are associated to. Don't worry if you have multiple courts, you'll be able to select them during the registration process.

Enter Your Court Information

Your Court: [Las Vegas Township Justice Court ▼]
Bar Number: [BAR0001]
Last Name: [Davidson]
I Am A: [Attorney ▼]

(Cancel) (Sign Up!)

Don't see your court? Contact the CV2Go support team.

PayPal  VISA  [MC/VR]  [BANK]

CV2Go uses PayPal to ensure easy and secure payments.

New Registration

Davidson

BAR0001

Cancel Registration

*Select a user name that will be easy for you to remember. User name and e-mail accounts must be unique in CV2Go. If you already have a CV2Go subscription you don't need to register new courts with a new user account. Instead, log in to CV2Go and select the Manage Subscriptions link.*

Contact CV2Go Support

Create a User Name and Add Courts to Your Cart

Please choose a User Name for your CV2Go subscription. You will use this User Name and Password to log in to CV2Go.

Then, to subscribe to a court's events, click the check box next to the court name.

Create Your User Account

| | |
|---|---|
| User Name | Davidson66 |
| Password | ******** |
| Confirm Password | ******** |
| Email | jason.davidson@court |
| Confirm Email | jason.davidson@court |

Select Your Courts

| Court | Subscription | Cost |
|---|---|---|
| ☑ Henderson City Municipal Court | Yearly | $300.00 |
| ☑ North Las Vegas Court | Yearly | $300.00 |
| ☑ Las Vegas Township Justice Court | Yearly | $300.00 |
| | Total Yearly Cost: | $900.00 |

( Cancel )  ( Review Cart and Checkout >> )

METHOD AND SYSTEM FOR PROVIDING CASE UPDATE NOTIFICATIONS

FIELD OF THE INVENTION

The present invention relates generally to information systems. In particular, the invention relates to a method and system for providing case update notifications.

BACKGROUND OF THE INVENTION

At the heart of the judicial system is the administration of events that allow parties to be heard on civil and criminal matters. This critical component of court management requires coordination of numerous resources including court staff (judges, prosecutors, clerks, probation officers, bailiffs, security, etc.), third-party court partners (interpreters, court reporters, police officers, etc.), and of course the parties and their representatives and/or attorneys.

Currently, most judicial court case management systems ("CMSes") are maintained to manage court case event schedules and details for court staff and officials. Court case events can include hearings, arraignments, deadlines for submissions, etc. Court case event details can include charge and claim data, plaintiff and defendant data, attorney data, etc. Some courts, in addition to the CMS, provide basic court case information on publicly-accessible passive Web sites. Typically there would not even be a way to easily determine what information is new since last time they searched or what information was recently updated. Parties to a case and their representatives and/or attorneys may be granted access to static case information via such a Web site in some systems upon manual requesting.

Interaction with the judicial system is traditionally quite manual. When the date for a hearing or other event in which parties and their representatives and/or attorneys are expected to participate is to be set or rescheduled, the representatives and/or the attorneys of the parties may be contacted by fax or mail. While a party is generally provided submissions made by the other party's representatives and/or attorneys, it can be desirable to manually check to see if the other party's representatives and/or attorneys have made submissions or if there are any other updates for a case by phone or in person, and then must either manually obtain a copy or have the court fax a copy to them. Other participants in the case do not currently have mechanisms that make specific information changes on their cases available to them directly. As a result, the process of case management is very manual, costly and prone to human error.

As the number of resources involved with a case goes up, so goes the likelihood of scheduling problems—whether due to availability of resources or conflicts between resources and the judicial officer. Under even the best of circumstances, the cost of coordinating these events is great and is generally borne by the courts and litigants. In a time of reduced staff and facilities, the expedient use of the court and its resources is critical to the successful management of justice.

Adding to scheduling complexity, most of these participants in the justice process are frequently on the move. Although many staff members commonly work at their desks, others are often not tied to a single workstation. Judges move between courtrooms—and even courthouses; prosecutors juggle multiple cases and schedules; support staff constantly balance competing demands and schedules; and outside attorneys deal with schedule demands both inside and outside the courthouse.

Last-minute and frequent changes to court schedules and event calendars can wreak havoc on all of these justice process participants. When so many people are on the go, changes to events can be easily missed. People waste time checking schedules, calling their offices, and talking to clerks just to make sure they have the latest case, schedule and calendar information.

Where a person participates in various courts and/or jurisdictions, the amount of manual effort rises multiplicatively.

It is therefore an object of the invention to provide a novel method and system for providing case update notifications.

SUMMARY OF THE INVENTION

According to an aspect of the invention, there is provided a judicial case management computer system, comprising:

receiving judicial court case updates via a judicial court case management system for a judicial court;

identifying at least one of said judicial court case updates as being of interest to a user unaffiliated with said judicial court that is participating in said judicial court case; and automatically notifying said user of said at least one judicial court case update.

The receiving can include receiving at least one change to a case management database.

The receiving can further include receiving at least one identifier for a participant in the judicial court case associated with the change.

The identifying can include comparing the identifier with a list of users subscribed to be notified of court updates.

The method can further include requesting further details for the judicial court case if the identifier matches one of the users in the list.

The method can further include:

storing an electronic address for said user;

and wherein said automatically notifying comprises:

notifying said user via said electronic address of said at least one judicial court case update.

The electronic address is one of an e-mail address, a Twitter account, a telephone number and a mobile device identifier.

The notifying can further include:

providing notification of a scheduled event via a file that can be imported into a calendar application.

The automatically notifying can include updating a calendar subscribed to by the user.

The identifying can include:

storing subscription configurations for a set of users in storage; and matching said judicial court case updates with said subscription configurations for said set of users.

The method can further include aggregating the judicial court case updates from at least two of the judicial court case management systems.

According to another aspect of the invention, there is provided a system for providing case update notifications, comprising:

storage;

judicial court case updates received via a judicial court case management system for a judicial court and stored in said storage, said judicial court case updates including an identifier of each participant in a judicial court case that is unaffiliated with said judicial court;

a customer settings database including said identifier and an electronic address for each of a set of users of said system stored in said storage;

computer-executable instructions stored in said storage, said computer-executable instructions implementing software when executed on said system that matches each of said judicial court case updates with said users in said customer settings database to identify at least one of said users interested in receiving each of said judicial court case updates, and automatically notifies said subset of said users of said at least one judicial court case updates via said electronic address.

The software can provide notification of a scheduled event via a file that can be imported into a calendar application.

The software can notify the at least one user by updating calendars subscribed to by the at least one user.

The system can be in communication with at least two case management computer systems for receiving the judicial court case updates.

BRIEF DESCRIPTION OF THE DRAWINGS

An embodiment will now be described, by way of example only, with reference to the attached Figures, wherein:

FIG. 4 shows a first registration Web page generated by the case update notification computer system of FIG. 1;

FIG. 5 shows a second registration Web page generated by the case update notification computer system of FIG. 1;

FIG. 7 shows a notifications management Web page generated by the case update notification computer system of FIG. 1;

FIG. 9 shows a notification history Web page generated by the case update notification computer system of FIG. 1;

DETAILED DESCRIPTION OF THE EMBODIMENT

Figure 1:
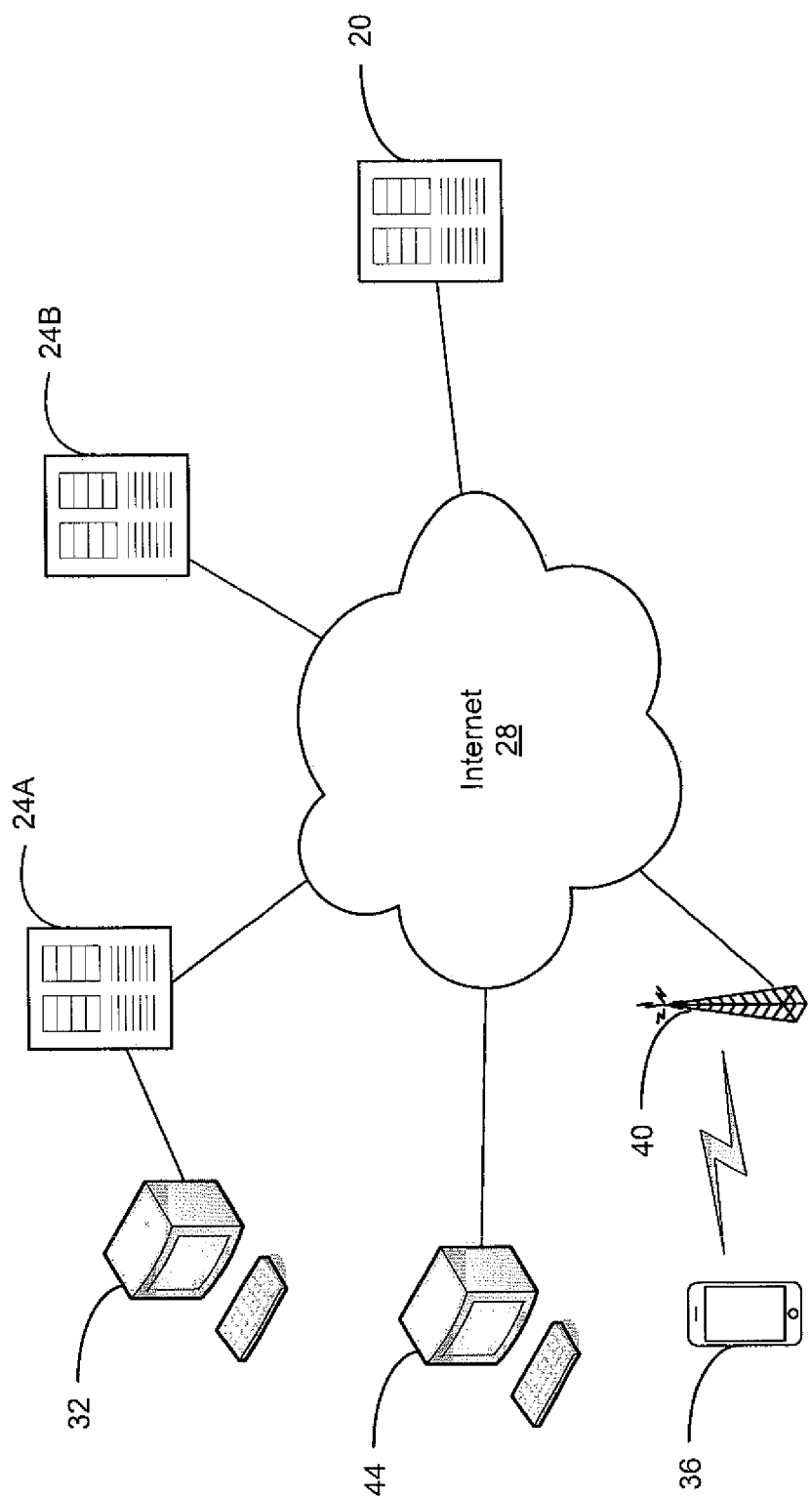
FIG. 1 shows a schematic diagram of a case update notification computer system in accordance with an embodiment of the invention and its operating environment.

A case update notification computer system 20 in accordance with an embodiment of the invention is shown in FIG. 1. The case update notification computer system 20 in this embodiment provides a subscription-based case update notification service, as well as an online portal that users can use to manage their subscription preferences, to keep informed of the latest case and schedule changes. The users include justice participants that are unaffiliated with the courts that may desire access to such information as available to court officers and staff members. Justice participants that are unaffiliated with the courts can include parties to a case (such as plaintiffs and defendants) and their representatives and attorneys, and other people, such as policemen, etc. The case update notification computer system 20 notifies users that are subscribed to the service in a personal manner about any and all activity and schedule changes for cases they are participants in. The notifications are configured for each user via a Web portal. Users can specify how they wish to receive notifications (such as via e-mail and Twitter) and what they wish to be notified of. Additionally, users can also receive notifications via a mobile application. Users can receive notifications of original event schedule for their case(s), changes to a hearing or event, and new actions filed on a case.

The case update notification computer system 20 is in communication with a number of case management computer systems 24A, 24B over a large, public network, such as the Internet 28. The case management computer systems 24 manage court case data from creation of the docket for cases to their final disposition and beyond. They manage the cases for a single court or for a set of courts for a jurisdiction. A client computer 32 is shown in communication with case management computer system 24A via a local area network. One or more client computers, such as client computer 32, can connect to a case management computer system 24. The client computers 32 are used by various judicial officers and court staff members at any of the court locations for the jurisdiction to communicate with a corresponding case management computer system 24 to access the functionality and data provided thereby. For example, when a written submission is received by a court, a court staff member can input data for its receipt, such as a title for the submission, the date of the submission, etc.

A mobile device 36 is also shown in communication with the case update notification computer system 20 via a cellular communications tower 40 that is coupled to the Internet 28 via a number of intermediate servers operated by one or more cellular communications carriers (not shown). The mobile device 36 is operated by a user that is a participant in a court case but not affiliated with the courts, such as a plaintiff, defendant or an attorney. A personal computer 44 is also shown in communication with the case update notification computer system 20 via the Internet 28. The personal computer 44 can be used by the user of the mobile device 36 to configure the service provided by the case update notification computer system 20.

Figure 2:
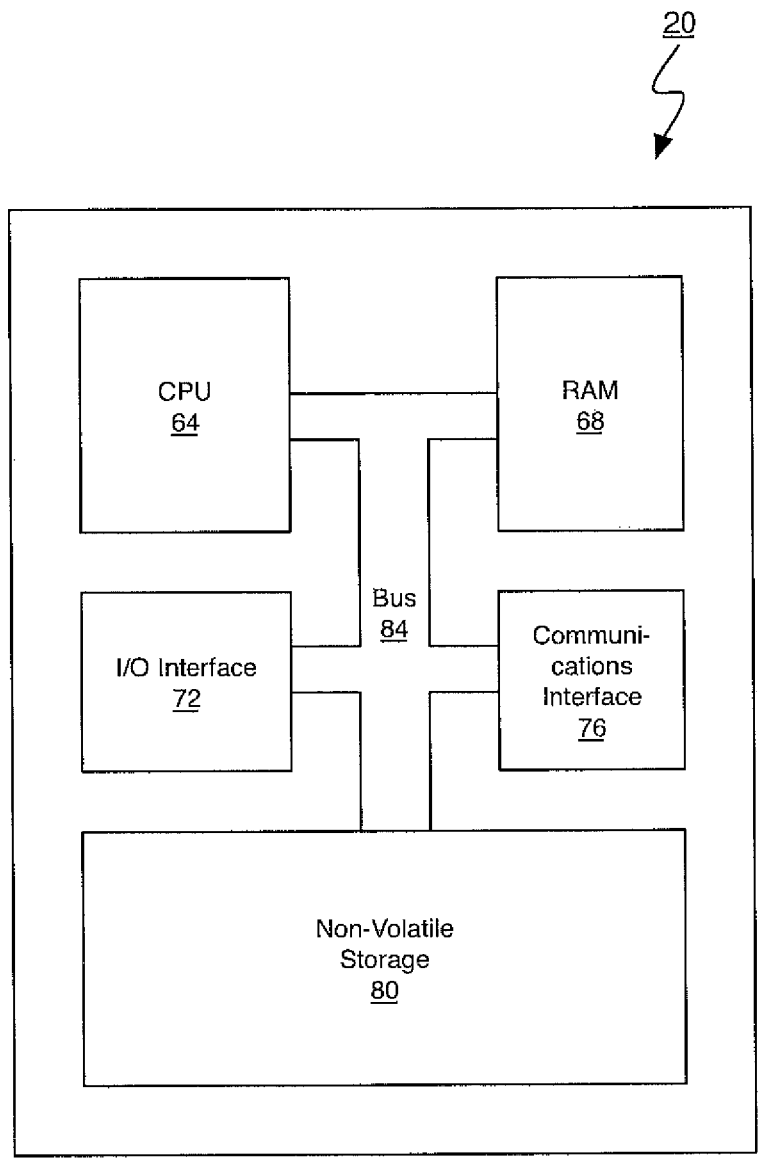
FIG. 2 shows a schematic diagram of the case update notification computer system of FIG. 1.

FIG. 2 shows various physical elements of the case update notification computer system 20. As shown, the case update notification computer system 20 has a number of physical and logical components, including a central processing unit ("CPU") 64, random access memory ("RAM") 68, an input/output ("I/O") interface 72, a network interface 76, non-volatile storage 80, and a local bus 84 enabling the CPU 64 to communicate with the other components. The CPU 64 executes an operating system and computer-executable instructions for implementing case update notification software as will be described. RAM 68 provides relatively-responsive volatile storage to the CPU 64. The I/O interface 72 allows for input to be received from one or more devices, such as a keyboard, a mouse, etc., and outputs information to output devices, such as a display and/or speakers. The network interface 76 enables communication with other systems. Non-volatile storage 80 stores the operating system, the computer-executable instructions for implementing the case update notification software and data stored and used by the case update notification software. During operation of the case update notification computer system 20, the operating system, the computer-executable instructions for implementing the case update notification software and the data may be retrieved from the non-volatile storage 80 and placed in RAM 68 to facilitate execution and access.

Figure 3:
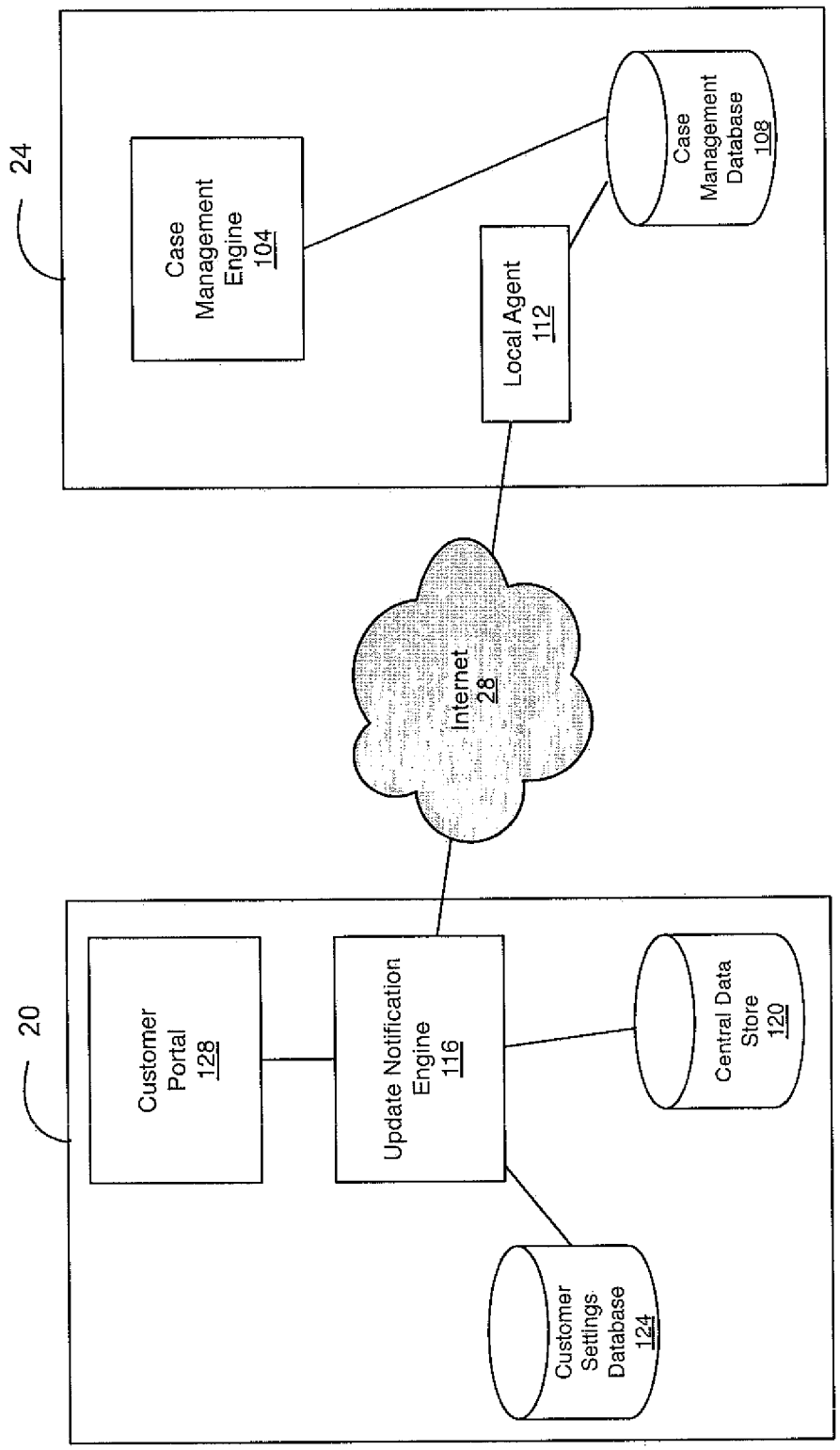
FIG. 3 shows a number of software and data components of the case update notification computer system and case management computer system of FIG. 1.

FIG. 3 shows various software and data components of the case update notification computer system 20 and the case management computer systems 24. The case management software executed by the case management computer system 24 includes a case management engine 104. The case management engine 104 acts as a central point for registering, scheduling and tracking case management elements, such as certain case activities, and guiding the processing and lifecycle of cases. A case is treated as a container for one or more incidents or legal matters, or a mixture thereof. The case management engine 104 manages cases from creation to disposition.

A case management database 108 stores data for the case management engine 104. The case management database 108 stores case history details (i.e., docket entries) and a case schedule for all of the cases of a court or set of courts in a set of database tables, as will be described below. Case history details include motions filed, answers filed, case dispositions, service returns, orders and alerts. Additionally, various events are scheduled during the lifetime of a case. Such events include hearings, trials, etc.

Using the case management computer system 24, a case is processed along the logical sequence of triggers, events, notifications, responses to notifications, incoming information, outgoing information and activities, as well as within time allowances and expiry boundaries for that case type.

Each time a docket entry is made or an event is scheduled, the case management engine 104 updates one or more tables in the case management database 108.

A local agent 112 is also executed by each case management computer system 24. Procedural code referred to as database triggers are associated with various tables in the case management database 108. When database tables with database triggers are updated, such as via the addition, deletion or modification of a record, the changes are written to an agent data store that is one or more separate database tables stored in the case management database 108.

The local agent 112 is in communication with an update notification engine 116 executed by the case update notification computer system 20. The communications between the local agents 112 executing on each case management computer system 24 and the update notification engine 116 executing on the case update notification computer system 20 are encrypted to safeguard the confidentiality of any sensitive information. The update notification engine 116 is the central aggregator and processor of updates received from the local agents 112 executing on each case management computer system 24 for various courts and sets of courts. The updates received from the local agents 112 are stored in a central data store 120.

A customer settings database 124 stores a user configuration for each user of the case update notification computer system 20. The user configuration includes, for each user, user credentials, electronic addresses where the user wishes to receive updates via direct electronic correspondence, and a subscription configuration that includes such information as the types of updates that are of interest to the user for each case, the level of detail provided with updates, etc.

A customer portal 128 is a Web service that enables users to log in to configure their service, change their registration information, view a transaction log history for cases of interest, pay subscription fees, etc. In order to receive updates, a user registers via a Web site operated by the customer portal 128.

FIG. 4 shows a first registration page generated by the customer portal 128. The first registration page enables a person to enter a first court or court system for which to receive updates, a bar number, a surname, and a title. Each attorney is provided a bar number by their local bar. This bar number is used to grant access to case updates for cases. As the attorneys are registered using the bar number for each case they are involved with, the bar number will identify cases that are of interest to the user. Users that are not attorneys can be assigned a "bar number" by the courts for use with the case update notification computer system 20 and case management computer systems 24. Once the information is entered, activation of the "Sign up!" button verifies the information entered. In particular, the case update notification computer system 20 verifies the bar number, surname and title with the appropriate case management computer system 24.

FIG. 5 shows a second registration page that is generated by the customer portal 128 after verification of the information entered on the first registration page of FIG. 4. The second registration page enables a person to enter login credentials including a username and a password, and an email address. The login credentials will be used for subsequent visits to the Web site operated by the customer portal 128 for managing registration information, subscriptions, filters, etc. In addition, the login credentials are used to authenticate a user logging in via a mobile application executing on a mobile device 36, and associate the mobile device 36 with the user's account. Further, a person can select additional courts for subscribing to updates. A list of other possible courts is generated based on matching the user's bar number with the bar numbers registered with participating courts. Upon completion of the second registration page, the user can proceed to process payment for the subscription.

Figure 6:
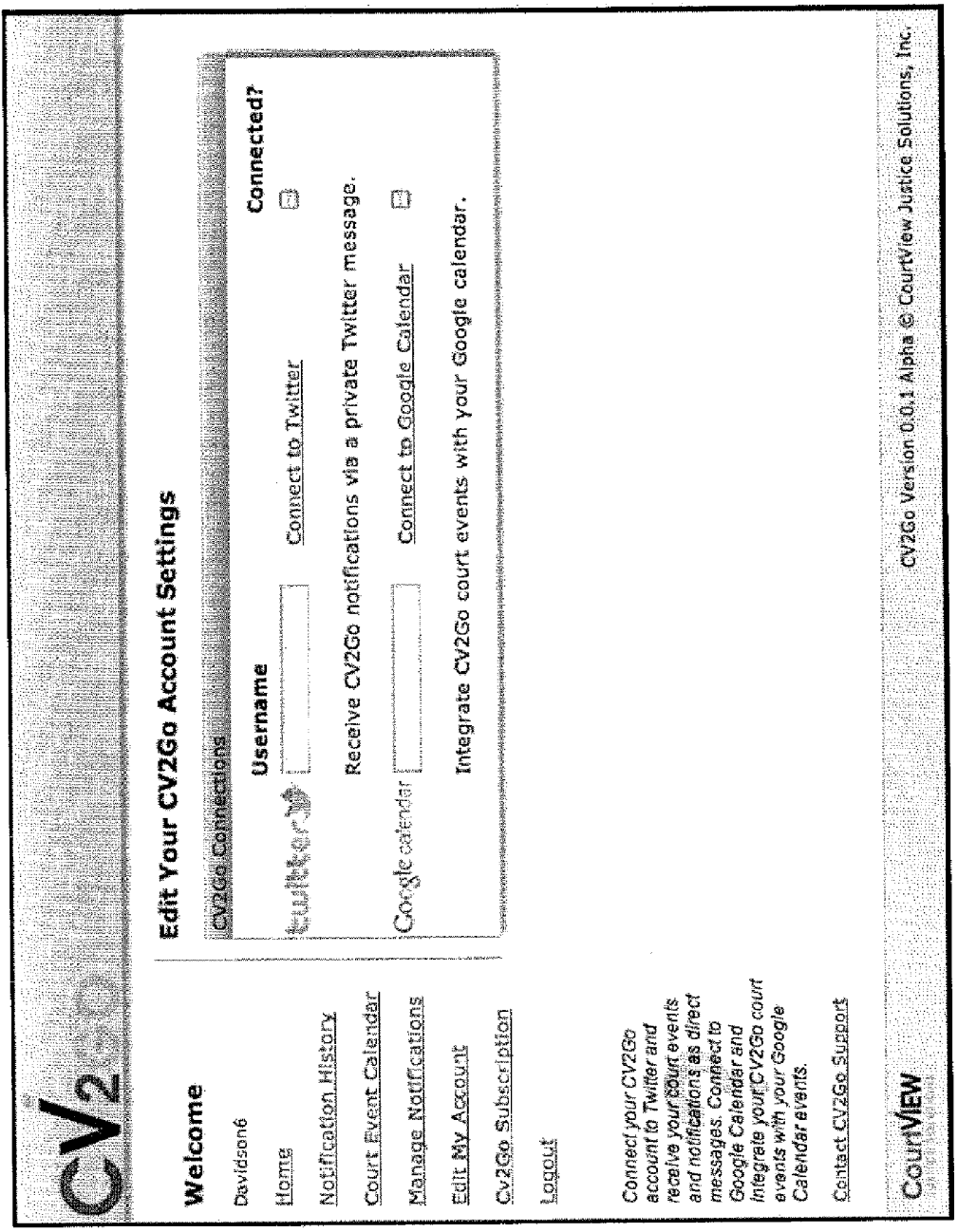
FIG. 6 shows an account settings Web page generated by the case update notification computer system of FIG. 1.

FIG. 6 shows an account settings page where a user can specify an electronic address for receiving updates. In particular, a user can enter a Twitter account name at which the user wishes to receive court update notifications. Further, in addition to receiving updates for scheduled events via the email address provided via the second registration page of FIG. 5, the user can also receive updates for scheduled events via a separate Google Calendar account. Of note is that when a user initializes a mobile application for receiving case update notifications, an identifier of the mobile device 36 is registered by the update notification engine 116 in the customer settings database 124 as an electronic address.

If a user subscribes to scheduled event notifications, the user is sent notification of the booking of or change to a scheduled event as an attachment to an email. The email is sent to the email address provided in the second registration page shown in FIG. 5, and additionally to an email address entered in the account settings page, if one is entered there. The attachments are in the iCalendar standard .ics format. When the email with the scheduled event notification is received by an email client, the email client generally interprets the attachment as a calendar entry and is processed as such by the associated calendar application. The .ics file indicates if it is a new event or an update to an existing event, the title of the event, the start and end times, the location, the resources, etc. As events take place and/or are scheduled, the user can be sent new and/or replacement scheduled event notifications as attachments via email to update the user's calendar. This enables the user to avoid having to input and manage a separate calendar for events related to court cases, thereby reducing manual labor and human error.

Figure 7:
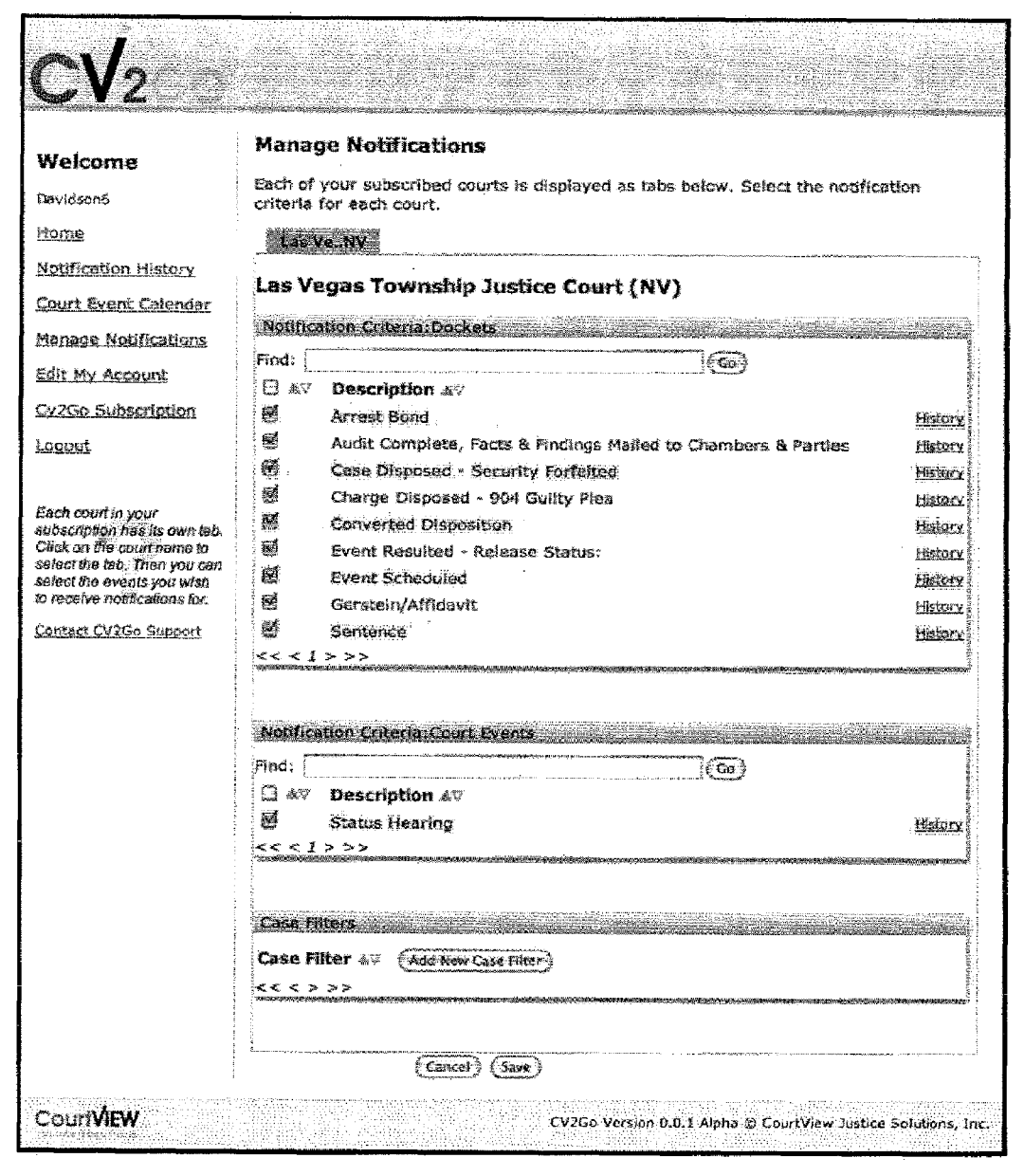

FIG. 7 shows a notification management page where a user can specify what he desires to receive updates about. In a first section, the user can specify updates by type. In a second section, the user can provide updates based on search criteria. In a third section, the user can manage the types of updates he wishes to receive by case. By default, when a user signs up, they will receive any and all updates for their cases.

Figure 8:
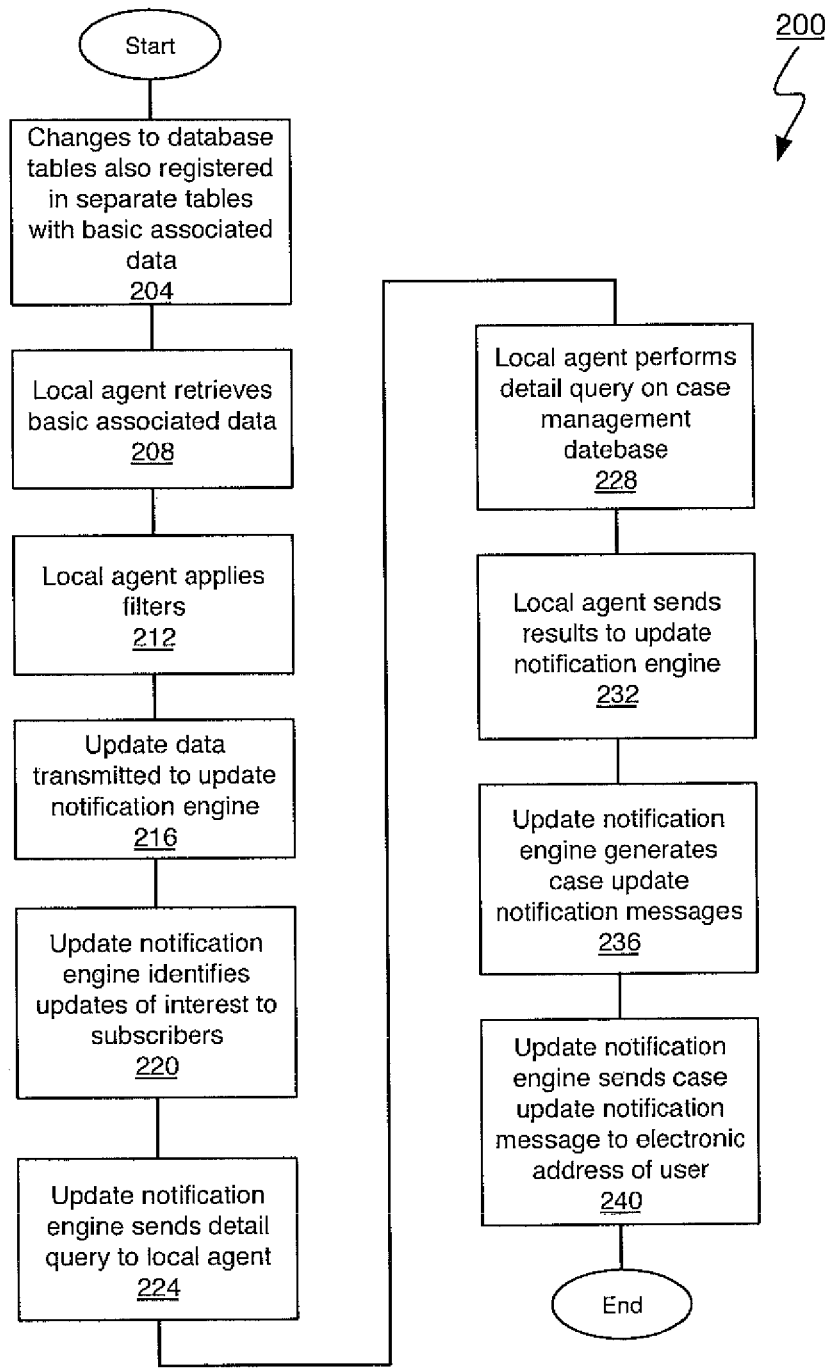
FIG. 8 is a flowchart of the general method of providing case update notifications performed by the case update notification computer system of FIG. 1.

The general method 200 of providing case update notifications will now be described with reference to FIG. 8. The method 200 commences with changes to database tables also being registered in separate tables with basic associated data (204). The case management computer system 24 makes changes to database tables during the course of the day as dockets are entered and events are scheduled. Some of the database tables have database triggers that cause the case management database 108 to register the changes made to the particular database tables in an agent data store of separate tables within the case management database 108, together with basic associated data. The basic associated data includes one or more bar numbers that identify participants in the case.

The local agent 112 retrieves the data changes and the basic associated data from the agent data store at regular intervals (208). Every 15 minutes, the local agent 112 polls the agent data store to determine what updates have occurred.

The local agent 112 then applies court filters to the retrieved data changes and basic associated data (212). The court filters can include certain case types and certain docket types. These case types and docket types can be customized for each case management computer system 24. In applying the court filters to the retrieved data changes and basic associated data, the local agent 112 removes updates that are deemed not of interest to users, or are private.

Once the data changes and basic associated data have been filtered, the local agent 112 transmits them to the update notification engine 116 executing on the case update notification computer system 20 (216). Upon receipt of the data changes and basic associated data, the update notification engine 116 stores them in the central data store 120. Next, the update notification engine 116 identifies updates of interest to subscribers (220). The update notification engine 116 compares the basic associated data stored in the central data store 120 to the bar numbers of the list of subscribers.

Upon identifying data changes and basic associated data that subscribers may be interested in, the update notification engine 116 sends a detail query to the local agent 112 (224). The detail query is a request for more details about the particular data changes whose basic associated data matches the bar numbers of subscribers. In particular, the detail query requests current event information, current activity information, court, case number, case title, parties, dockets, etc. In turn, the local agent 112 performs a detail query on the case management database 108 to retrieve details associated with these data changes (228). Upon receiving the results from the case management database 108, the local agent 112 sends the results to the update notification engine 116 (232). Upon receiving the details associated with the particular data changes, the update notification engine 116 stores the details in the central data store 120.

The update notification engine 116 then generates case update notification messages for the particular data changes (236). The update notification engine 116 queries the customer settings database 124 to determine how the users identified as participants in the corresponding cases specified to receive updates. As will be understood, the form of an update notification message on a mobile device differs from the form of an update notification message sent via email and that sent as a calendar update. Further, the update notification engine 116 applies user filters stored in the customer settings database 124 that indicate the type of updates that the customer wishes to receive update notifications for. Users can specify filters by update type, keywords and case.

In addition to transmitting case update notification messages, the update notification engine 116 can transmit calendar events, depending on the configuration for each user.

The case update notifications may thus be sent as an email, a Twitter message, or a message to the mobile device 36 of the user to be received and presented by a mobile application executing thereon.

Once the update notification engine 116 has generated the update notification messages, it then sends them to the electronic address of the user (240).

The user may also view notifications by logging into the Web site operated by the customer portal 128.

Figure 9:
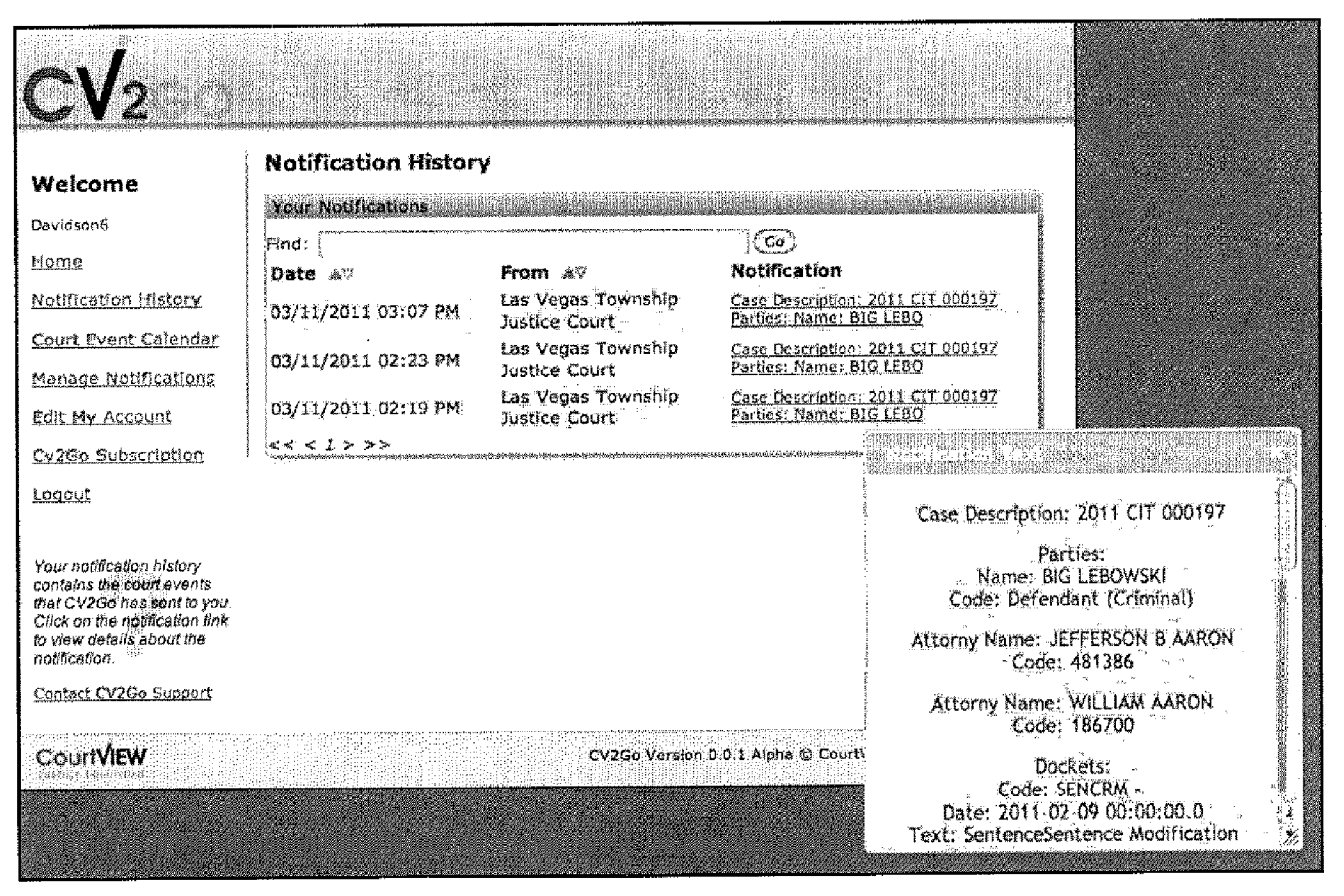

FIG. 9 shows a notification history Web page generated by the case update notification computer system 20 that presents a list of notifications that have been sent to a user. Here, a user can sort the list of update notifications and view the update notification message that was forwarded to him.

Figure 10:
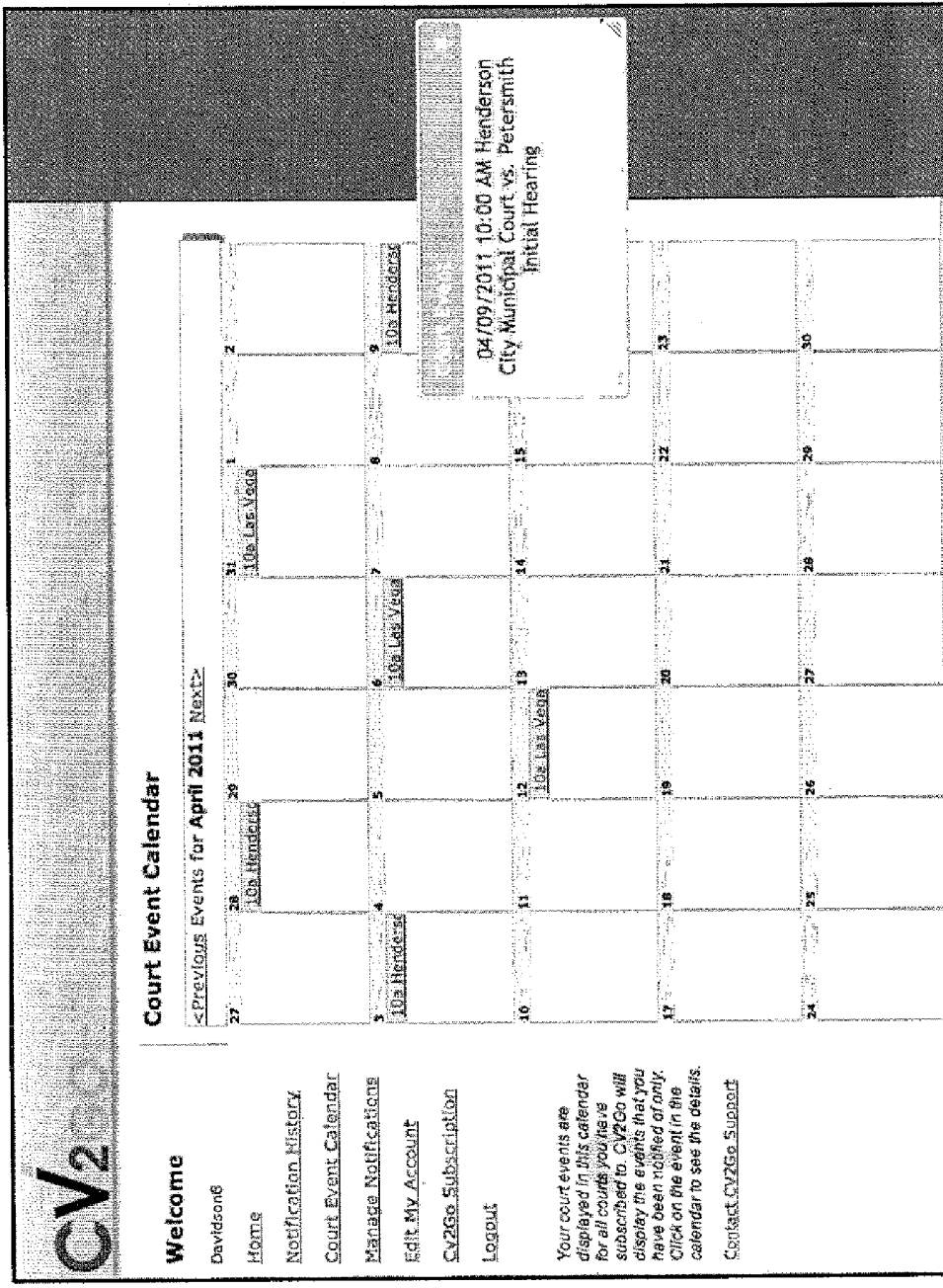
FIG. 10 shows a calendar Web page generated by the case update notification computer system of FIG. 1.

FIG. 10 shows a calendar showing the scheduled events for cases that a user is participating in. The calendar displays all of the scheduled events that the user has been sent notifications for.

A user can use a mobile application installed on a mobile device 36 to receive and view the case update notifications. This is advantageous as the user will be able to readily view all of the user's update notifications without opening a Web browser and logging into the Web site operated by the customer portal 124.

Figure 11:
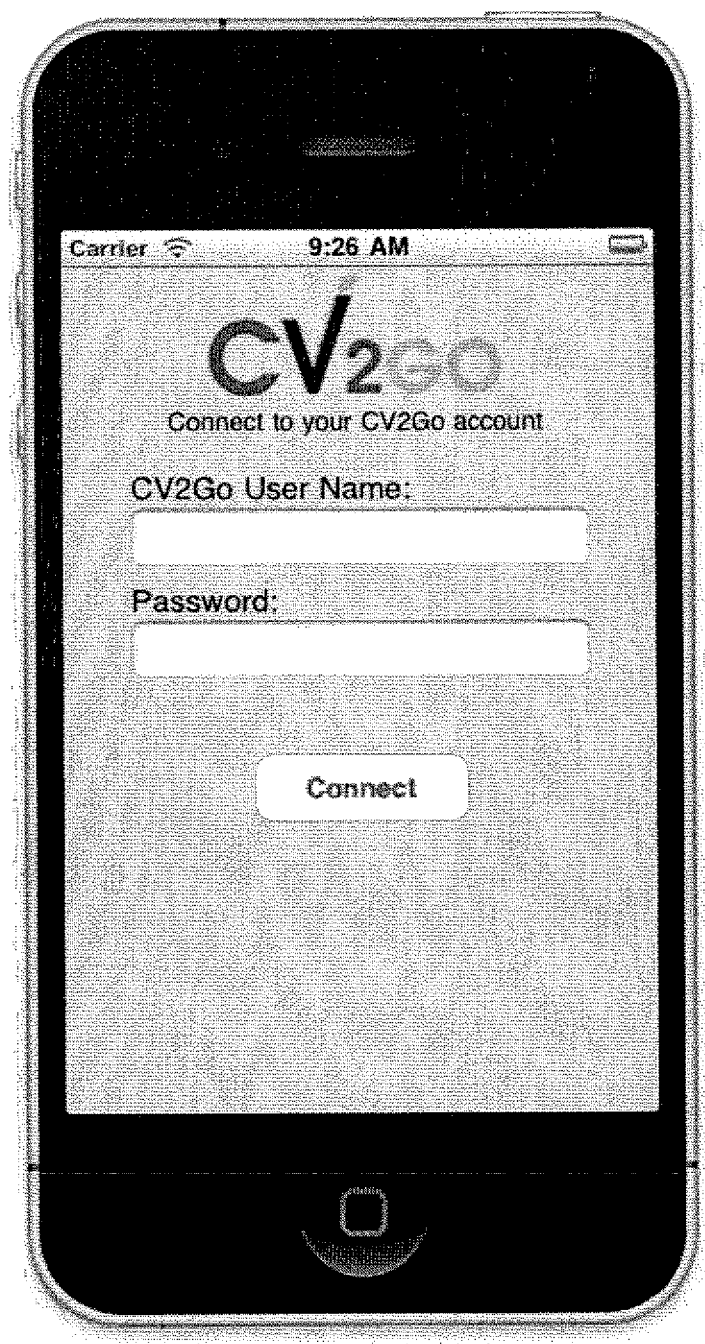
FIG. 11 shows a login screen presented by a mobile application executing on the mobile device of FIG. 1.

FIG. 11 shows a login screen of a mobile application for providing case update notifications that is installed on a smartphone. Upon installation and first execution of the mobile application, the mobile application presents a login screen so that the user can enter in his login credentials. These are the login credentials provided by the user during registration with the service. Upon successfully entering his login credentials, the mobile application executing on the mobile device 36 is registered to the user in the customer settings database 124. The user may install the mobile application on two or more mobile devices 36, in which case both mobile devices 36 will be registered in the customer settings database 124.

Figure 12:
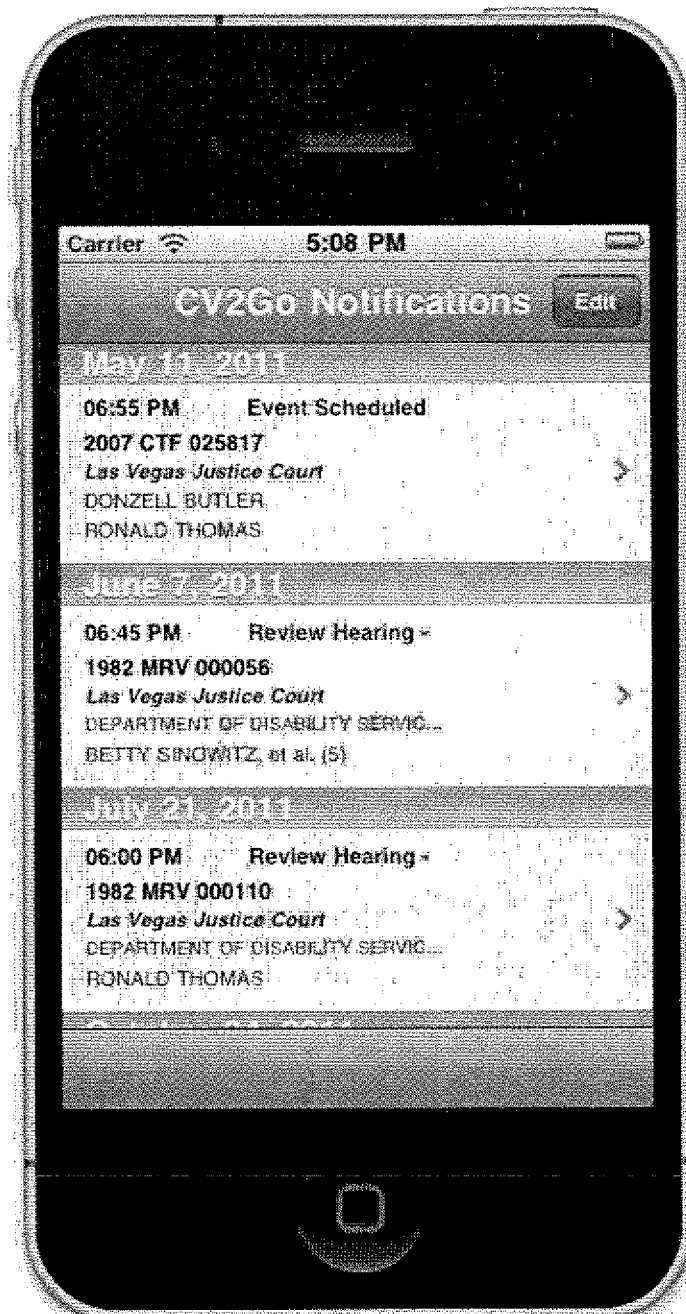
FIG. 12 shows a notification history screen presented by a mobile application executing on the mobile device of FIG. 1.

FIG. 12 shows a notification history screen presented to the user on the mobile device 36. As the case update notifications are received by the mobile application, they are stored for later presentation and review. An abbreviated list of details is shown for each case update.

Figure 13:
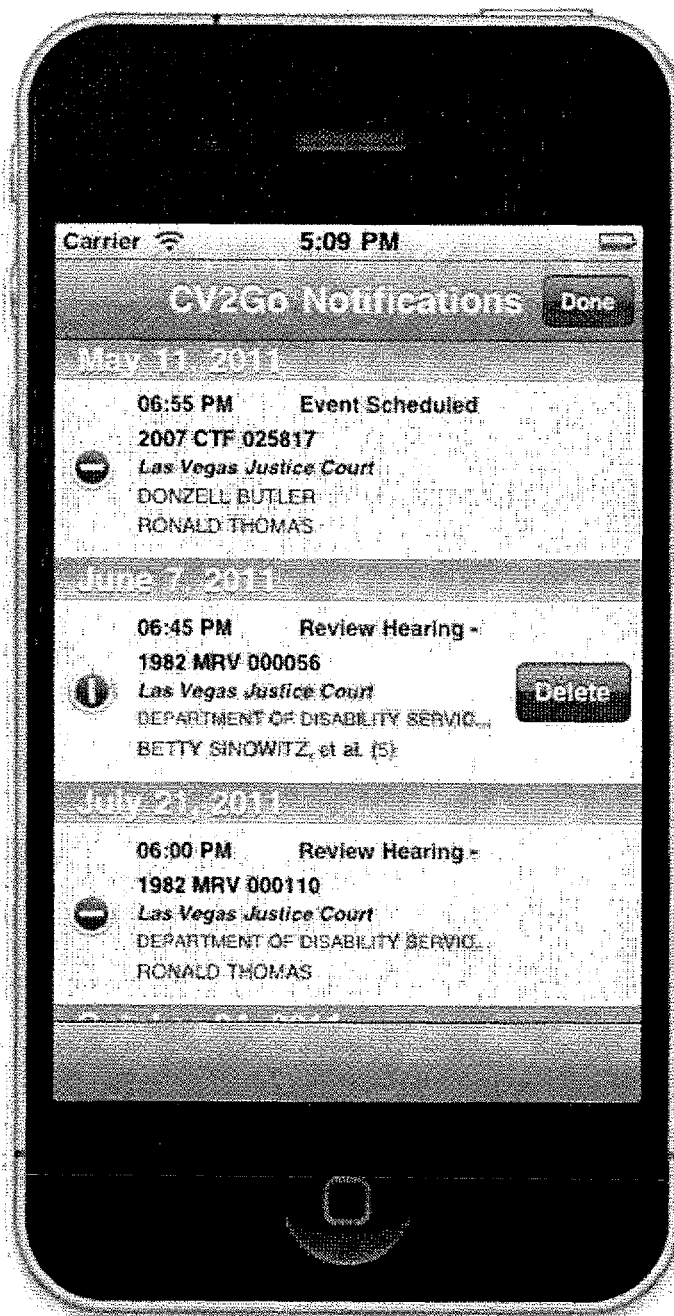
FIG. 13 shows the editing of notifications on the notification history screen of FIG. 17.

FIG. 13 shows the editing of the list of case update notifications stored by the mobile application via an "edit" button shown in FIG. 12. Individual case update notifications can be selected and deleted.

Figure 14:
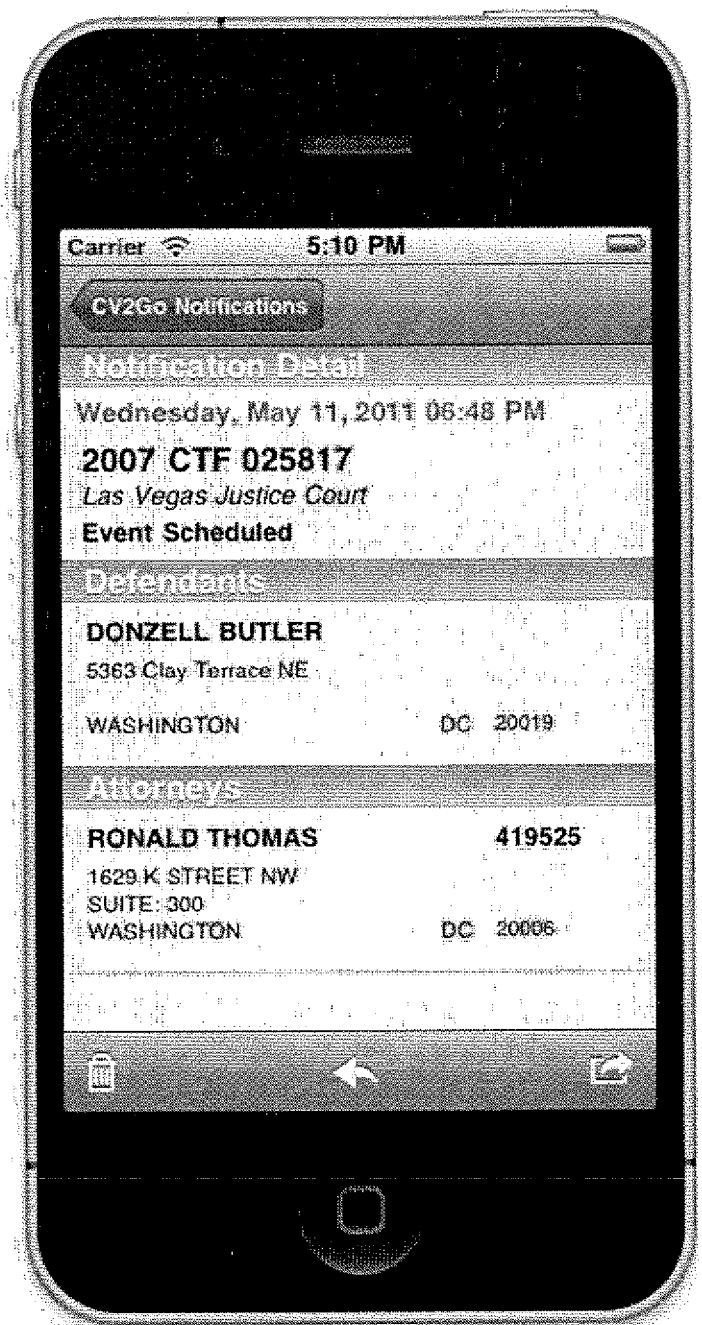
FIG. 14 shows a notification details screen presented by a mobile application executing on the mobile device of FIG. 1.

FIG. 14 shows a screen presented by the mobile application after selection of one of the case update notifications from the list shown in FIG. 12. The screen discloses full details for the selected case update notification.

Using the case update notification computer system 20 promotes better adherence to schedules. Further, as the amount of manual checking of the status of court cases is decreased, the expenditures for both the courts and case participants can be reduced.

The user may be notified of updates when the mobile application is not open via any of a number of manners. For example, an icon representing the application can be provided with a notification badge that displays the number of notifications that have not been viewed yet.

By aggregating court case updates from multiple courts and/or court systems, a user can receive case update notifications for all of the cases that they are participating in through one channel, regardless of the jurisdiction or court.

While transport of the case update notifications has been described in detail with respect to a mobile application and Twitter, those skilled in the art will appreciate that other modes of delivering the case update notifications can be employed. For example, the case updates can be delivered via Short Message Service ("SMS", or "text") messages. In this case, the electronic address provided by the user would be a telephone number associated with a mobile telephone. Alternatively, or additively, the case update notifications can be delivered via email to an email address specified by the user.

In an alternative embodiment, an account may be created for a law firm, and sub-accounts can be created for people at the law firm. Receipt of case update notifications can be delegated to people at the law firm. This can be advantageous for larger cases, where different groups within a law firm are responsible for different aspects of a case.

In another alternative embodiment, calendar updates are provided via a calendar that is subscribed to by a user. In this scenario, calendar event notifications would not need be sent as email attachments.

Computer-executable instructions for implementing the case update notification software on a computer system could be provided separately from the computer system, for example, on a computer-readable medium (such as, for example, an optical disk, a hard disk, a USB drive or a media card) or by making them available for downloading over a communications network, such as the Internet.

The functionality of the case update notification computer system can be merged with one or more single case management computer systems.

While the computer system is shown as a single physical computer, it will be appreciated that the computer system can include two or more physical computers in communication with each other. Accordingly, while the embodiment shows the various components of the judicial case management software residing on the same physical computer, those skilled in the art will appreciate that the components can reside on separate physical computers.

One or more portions of the method may be executed by third parties.

The above-described embodiments are intended to be examples of the present invention and alterations and modifications may be effected thereto, by those of skill in the art, without departing from the scope of the invention that is defined solely by the claims appended hereto.

What is claimed is:

1. A method for providing case update notifications, comprising:
    associating a bar number with a user comprising: assigning the bar number to a non-attorney user or receiving the bar number from an attorney user;
    receiving a first set of judicial court case updates from at least one judicial court case management system for a first judicial court;
    identifying at least one of said first set of judicial court case updates as being associated with said bar number; said bar number being unaffiliated with said first judicial court that is participating in said judicial court case;
    applying, to the at least one of said first set of judicial court case updates, at least a first set of user filters stored in a customer settings database that indicate the types of judicial court case updates that the customer wishes to receive for the first judicial court;
    querying the customer settings database to determine user-specified settings of how to receive judicial court case updates for the first judicial court; and
    automatically notifying, after said applying, said user of said at least one of said first set of judicial court case updates, based on the user-specified settings of how to receive the judicial court case updates for the first judicial court.

2. The method of claim 1, wherein said receiving comprises:
    receiving at least one change to a case management database.

3. The method of claim 2, wherein said receiving further comprises:
    receiving at least one identifier for a participant in said judicial court case associated with said change.

4. The method of claim 3, wherein said identifying comprises:
    comparing said identifier with a list of users subscribed to be notified of court updates.

5. The method of claim 4, further comprising:
    requesting further details for said judicial court case if said identifier matches one of said users in said list.

6. The method of claim 1, further comprising:
    storing an electronic address for said user;
    and wherein said automatically notifying comprises:
        notifying said user via said electronic address of said at least one judicial court case update.

7. The method of claim 6, wherein said electronic address is one of an e-mail address, a Twitter account, a telephone number and a mobile device identifier.

8. The method of claim 6, wherein said notifying further comprises:
    providing notification of a scheduled event via a file that can be imported into a calendar application.

9. The method of claim 1, wherein said automatically notifying comprises:
    updating a calendar subscribed to by said user.

10. The method of claim 1, wherein said identifying comprises:
    storing subscription configurations for a set of users in storage; and
    matching said judicial court case updates with said subscription configurations for said set of users.

11. The method of claim 1, further comprising:
    aggregating said judicial court case updates from at least two of said judicial court case management systems.

12. A system for providing case update notifications, comprising:
    storage;
    a first set of judicial court case updates received from a judicial court ease management system for a first judicial court and stored in said storage, said judicial court case updates including bar number of each participant in a judicial court case that is unaffiliated with said first judicial court;
    a customer settings database including a first set of user-specified settings of how to receive judicial court case updates for the second judicial court, a first set of user filters that indicate the types of judicial court case updates that the customer wishes to receive for the first judicial court, said bar number and an electronic address for each of a set of users of said system stored in said storage; said bar number associating at least one of said users with two or more judicial courts;
    computer-executable instructions stored in said storage, said computer-executable instructions implementing software when executed on said system that matches each of said judicial court case updates with said users in said customer settings database to identify at least one of said users interested in receiving each of said judicial court case updates, and automatically notifies said subset of said users of said at least one said first judicial court case updates via said electronic address and according to the first set of settings and first set of user filters.

13. The system of claim 12, wherein said software provides notification of a scheduled event via a file that can be imported into a calendar application.

14. The system of claim 12, wherein said software notifies said at least one user by updating calendars subscribed to by said at least one user.

15. The system of claim 12, wherein said system is in communication with at least two case management computer systems for receiving said judicial court case updates.

16. The method of claim 1 further comprising:
receiving a second set of judicial court case updates from at least one judicial court case management system for a second judicial court;
identifying at least one of said second set of judicial court case updates as being associated with said bar number; said user being unaffiliated with said a second judicial court that is participating in said judicial court case;
applying, to the at least one of said second set of judicial court case updates, at least a second set of user filters stored in a customer settings database that indicate the types of judicial court case updates that the customer wishes to receive for the second judicial court;
querying the customer settings database to determine user-specified settings of how to receive judicial court case updates for the first judicial court;
automatically notifying, after said applying, said user of said at least one of said second set of judicial court case updates, based on user-specified settings of how to receive the judicial court case updates for the second judicial court.

17. The method of claim 16 wherein the first set of user filters is different from the second set of user filters.

18. The system of claim 12 further comprising:
a first set of judicial court case updates received from a judicial court ease management system for a first judicial court and stored in said storage, said judicial court case updates including bar number of each participant in a judicial court case that is unaffiliated with said first judicial court;
wherein the customer settings database further comprises a second set of user-specified settings of how to receive judicial court case updates for the second judicial court, a first set of user filters that indicate the types of judicial court case updates that the customer wishes to receive for the second judicial court; and
the computer-executable instructions further matches each of said judicial court case updates with said users in said customer settings database to identify at least one of said users interested in receiving each of said judicial court case updates, and automatically notifies said subset of said users of said at least one said second judicial court case updates via said electronic address and according to the second set of settings and second set of user filters.

19. The system of claim 18 wherein the first set of user filters is different from the second set of user filters.

20. The method of claim 1 wherein the first set of user filters comprises an update type filter, a keyword filter and a case filter.

21. The system of claim 12 wherein the first set of user filters comprises an update type filter, a keyword filter and a case filter.

\* \* \* \* \*

UNITED STATES PATENT AND TRADEMARK OFFICE
CERTIFICATE OF CORRECTION

| | | |
|---|---|---|
| PATENT NO. | : 9,292,890 B2 | Page 1 of 1 |
| APPLICATION NO. | : 13/172547 | |
| DATED | : March 22, 2016 | |
| INVENTOR(S) | : Tor Gudmundsen et al. | |

It is certified that error appears in the above-identified patent and that said Letters Patent is hereby corrected as shown below:

In the Claims

Column 10, Line 49, Claim 12:

After "from a judicial court"
Delete "ease" and
Insert -- case --.

Column 12, Line 8, Claim 18:

After "from a judicial court"
Delete "ease" and
Insert -- case --.

Signed and Sealed this
Seventh Day of June, 2016

Michelle K. Lee
*Director of the United States Patent and Trademark Office*